Jan. 9, 1968 C. W. BOGS ETAL 3,363,258
CONTINUOUS AMPLITUDE FREQUENCY DISPLAY
Filed Aug. 11, 1965 5 Sheets-Sheet 1

INVENTORS.
CHARLES W. BOGS,
ROBERT F. GREGORY,
BY
John J. Schneider
ATTORNEY.

INVENTORS.
CHARLES W. BOGS,
ROBERT F. GREGORY,
BY
ATTORNEY.

Jan. 9, 1968 C. W. BOGS ET AL 3,363,258
CONTINUOUS AMPLITUDE FREQUENCY DISPLAY
Filed Aug. 11, 1965 5 Sheets-Sheet 4

INVENTORS.
CHARLES W. BOGS,
ROBERT F. GREGORY,
BY
ATTORNEY.

United States Patent Office 3,363,258
Patented Jan. 9, 1968

3,363,258
CONTINUOUS AMPLITUDE FREQUENCY DISPLAY
Charles W. Bogs, Houston, Tex., and Robert F. Gregory, Denver, Colo., assignors to Esso Production Research Company
Filed Aug. 11, 1965, Ser. No. 478,961
20 Claims. (Cl. 346—33)

ABSTRACT OF THE DISCLOSURE

A continuous amplitude frequency color presentation of seismic wave energy in which seismic frequency spectra are translated to light wave lengths in a linear manner and recorded; amplitudes of the seismic wave energy are represented as intensities of the light wave lengths. Such presentation permits filtering the light waves to pass or reject particular light waves representative of particular frequencies in the seismic spectrum.

---

The present invention relates generally to the presentation of electrical transients. In particular, it concerns linearly reproducing audio-seismic spectra as light wave lengths. More particularly, the invention concerns reproducing seismic data in a linear manner in varying and distinctive colors.

As is well known in geophysical prospecting, a seismic disturbance is initiated at a particular point in or near the earth's surface to direct seismic waves downwardly through the subsurface. These waves are reflected back to the surface from underlying formations and are detected at spaced points on the earth's surface which are at selected distances from the disturbance point. The depths of subsurface reflecting strata can be determined by measuring the time intervals between initiation of the disturbance and detection of the reflected waves at the detection points. Various corrections may be made to adjust the arrival times of the reflected waves to compensate, for example, for variations in elevation of the disturbance point and the various detecting points and to compensate for the low velocity layer of the earth at the several detecting points.

Amplitude, frequency, total energy, and other parameters of seismic signals aid observers in determining the characteristics of subsurface structures. Various techniques have been used to present the signals in forms that are easy to analyze. One such technique is to display the signals in variable density or variable color forms in which the signals are reproduced as photographic traces which vary in intensity, blends of black and white, or blends of color in proportion to variations in amplitude or frequency, or some other parameter of these signals.

A primary object of the present invention is to provide method and apparatus for an improved display of seismic data in colors. The improved presentation results from the use of a wave length translator or converter with which the seismic frequency spectra are translated or converted to light wave lengths in a linear manner. The improved display technique permits filtering light waves in a manner similar to the manner in which electrical filters are used to pass or reject particular frequencies in a seismic spectrum.

Briefly, the invention comprises a method for recording the seismic spectrum as three photographic traces in colors representative of three different frequency bands or mixtures of different frequency bands of the seismic signals within the seismic spectrum. The colors reproduced or recorded are either the three primary additive colors, red, green, and blue, or the three subtractive colors, red, yellow, and blue, in any desired arrangement. The amplitudes of the seismic signals are represented as intensities of these colors.

The apparatus for carrying out this method includes electrical filters for separating the seismic signal into selected frequency band widths; and mixing circuits; and variable resistors to determine the percentage of the signal coming from a particular filter to be mixed with the portion of the signal coming from another filter; and three moving coil, mirror galvonameters to which the mixed portions of the signal are fed; each of these galvanometers causes reproduction of a different one of the primary colors. A double-tapered, variable density strip or light barrier, opaque or black in the center and clear at the ends, is used to vary the intensity of the colored light reflected in response to variations in amplitude of the seismic signal. This light barrier is particularly adaptable for use with the full-wave signal. When a half-wave signal is to be presented, a tapered, variable density strip or light barrier, which is opaque at one end and tapers to clear at its other end, is preferred. Means to compensate for the time delay of each narrow band filter and place the frequency of the signals fed to the electrical filters from the geophone or playback magnetic record in phase may be included in the system. Also, as indicated, full- or half-wave rectifiers and integrator circuits may be included.

Each filter passes transients having a given frequency or frequency range to the mixing system which proportions the filter output into three parts to the mirror galvanometers which are adapted to direct selected colored light of varying intensity onto a moving, color-sensitive, photographic medium. If only three filters are used, the mixing system could be omitted. Each of the three output parts of the mixing system is associated with light of a distinguishing color; and therefore, that portion of the signal within the frequency range of each output part of the mixing system can be readily identified from its color on the trace. Variations in the signal amplitude are shown by changes in the intensity of the trace due to changes in the intensity of the light striking the photographic medium. This presentation, then, permits changes in both the amplitude and frequency of the seismic signals to be readily detected. The linear translation of the seismic spectrum into three primary colors permits the transmission of the light waves from one color or combination of colors representative of a selected seismic frequency to the eye of the observer while all other light waves can be attenuated. Records prepared in this manner greatly facilitate the interpretation and analysis of seismic information and make available information which cannot be derived from conventional, variable density records.

The above object and other objects, as well as advantages of the invention will be more apparent from the following more detailed description of the invention when taken with the drawings wherein.

Figure 1:
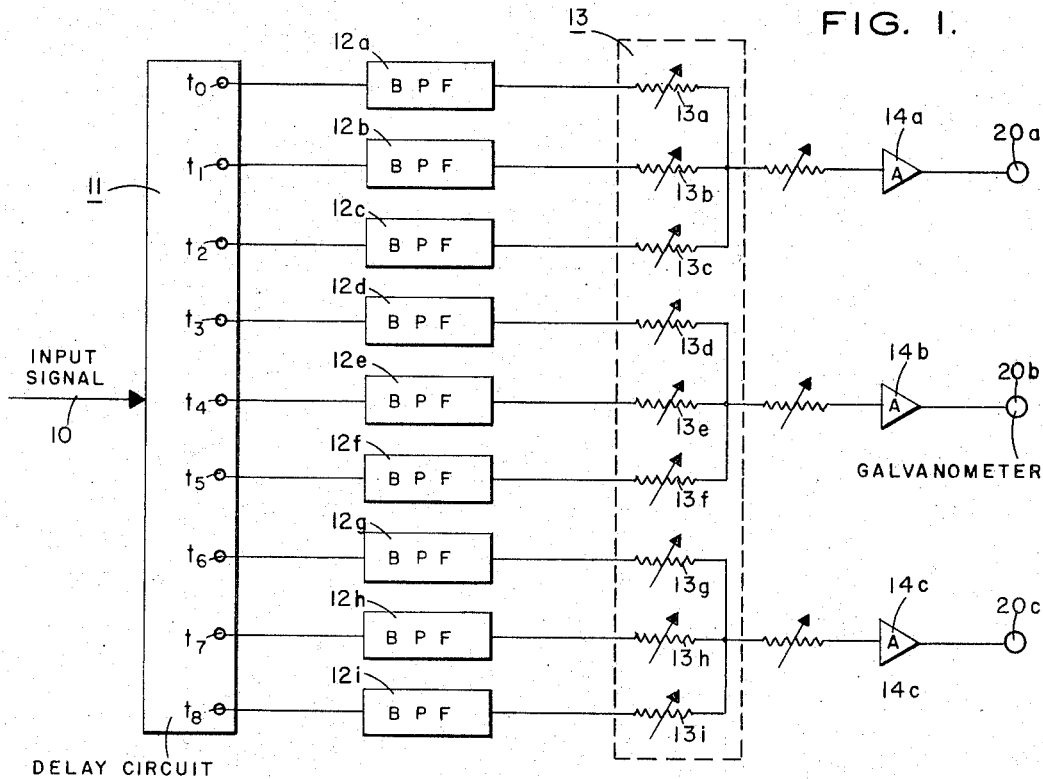
FIG. 1 is a block diagram of the electrical apparatus used to determine the signal fed to each of the mirror galvanometers.
Figure 2:
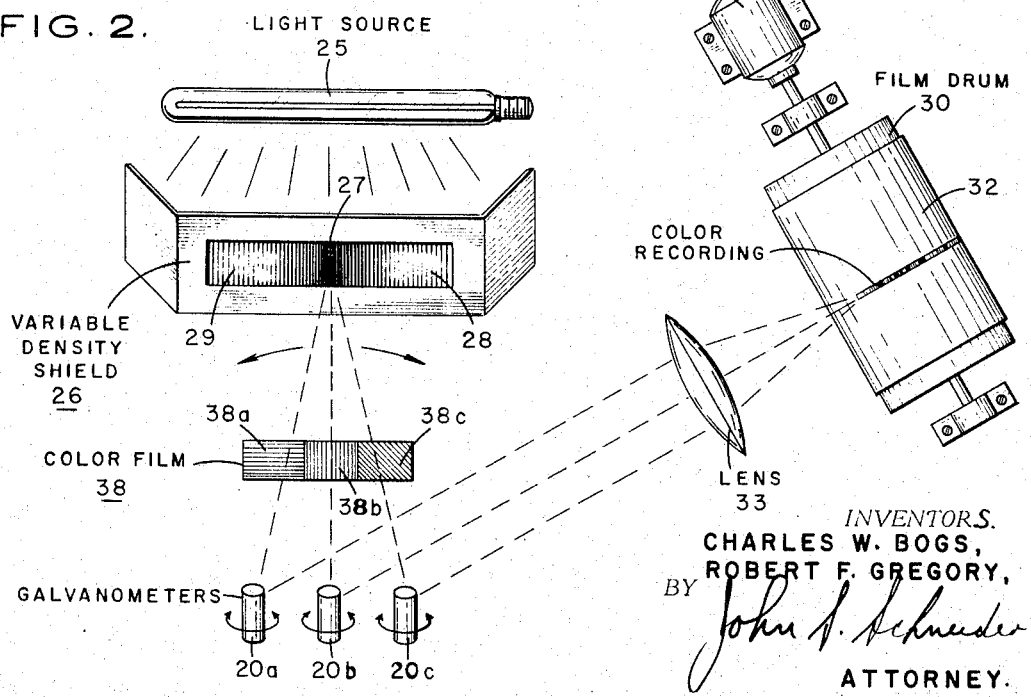
FIG. 2 is a schematic view of the camera portion of the apparatus used to display the color film record of the invention.
Figure 3:
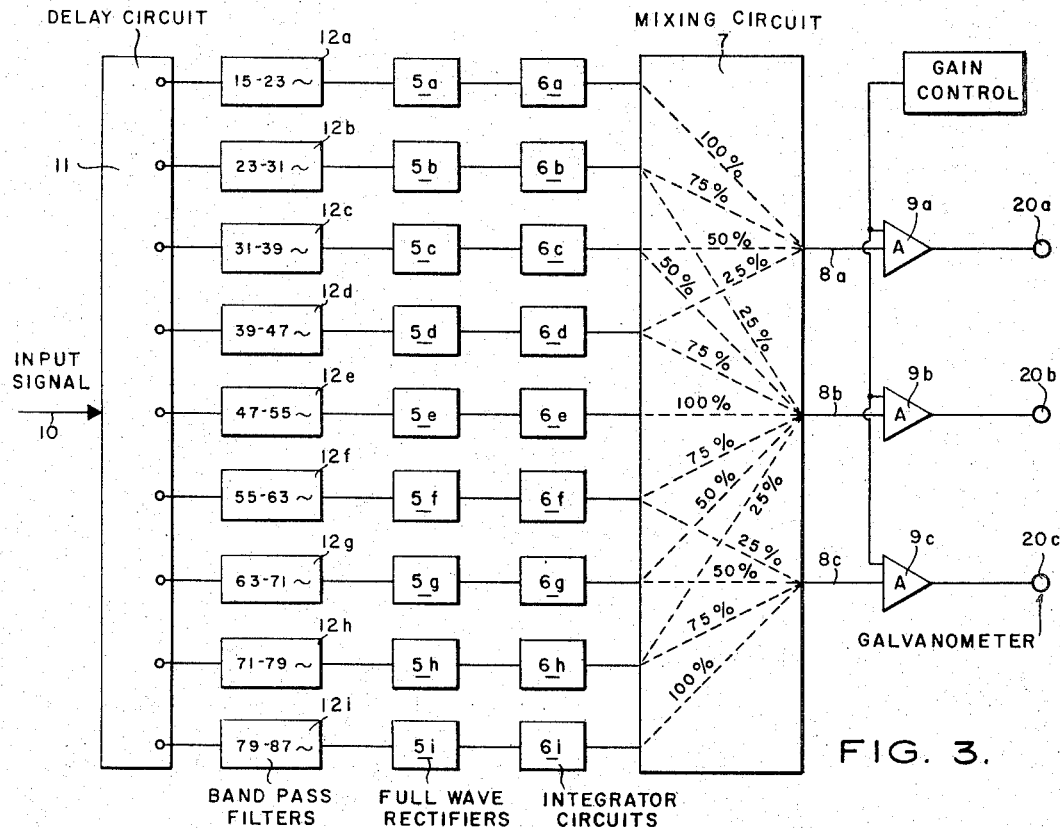
FIG. 3 is a block diagram of the electrical apparatus used to determine the signal fed to each of the mirror galvanometers of a modification of the invention.
Figure 4:
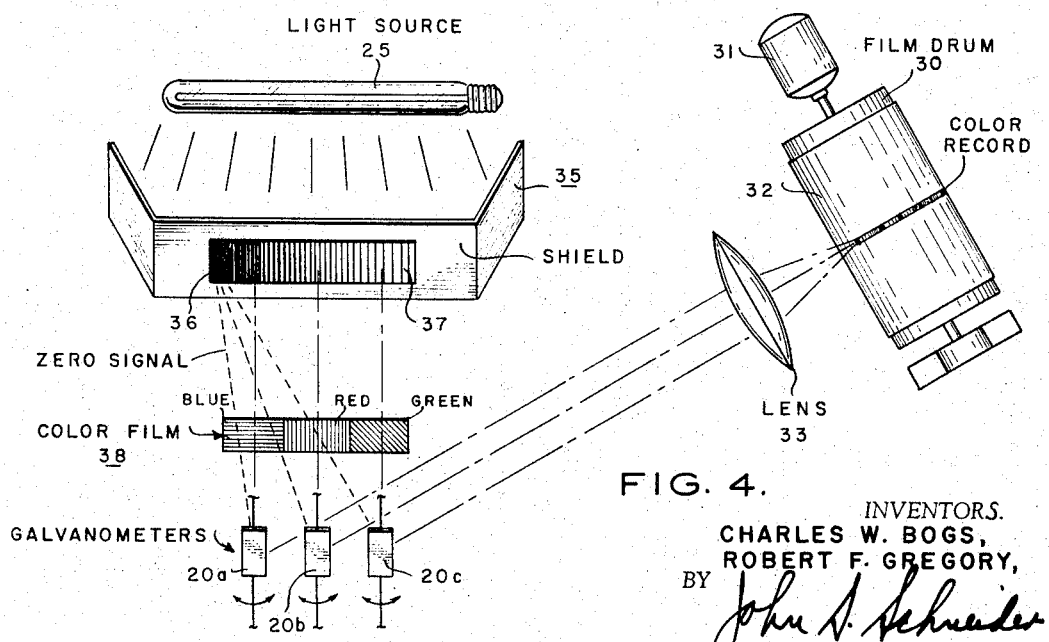
FIG. 4 is a schematic view of the camera portion of the apparatus of a modification of the invention.
Figure 5:
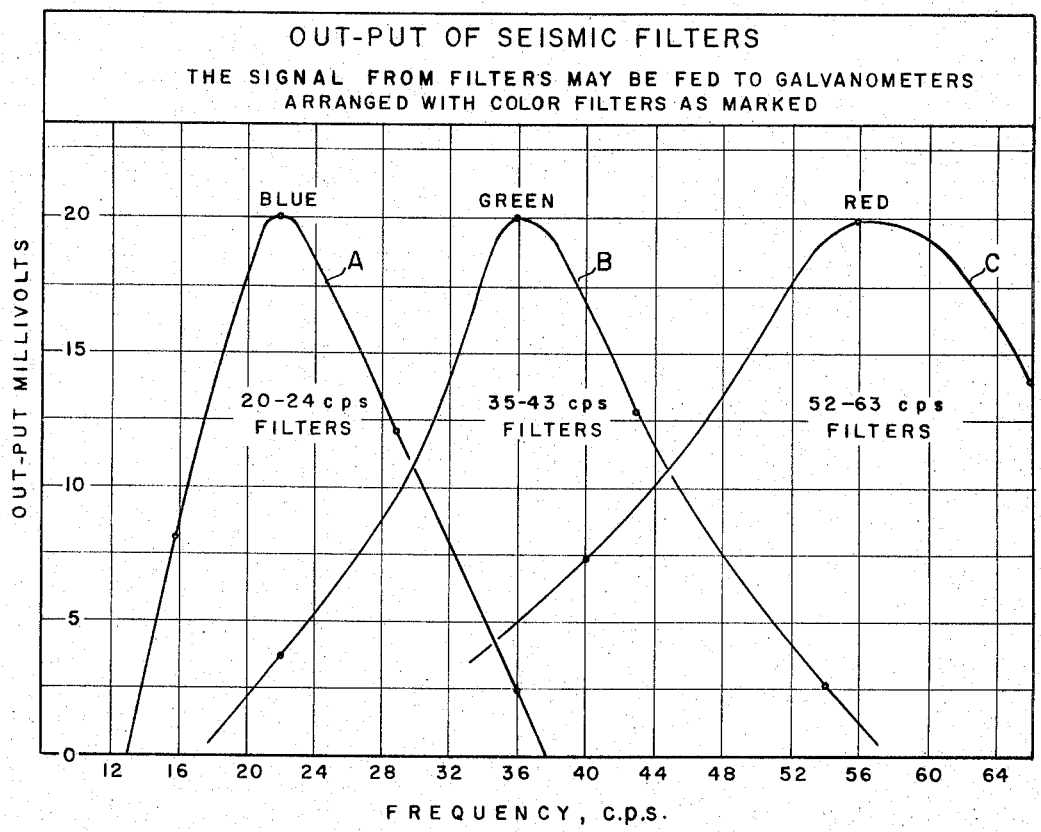
Figure 6:
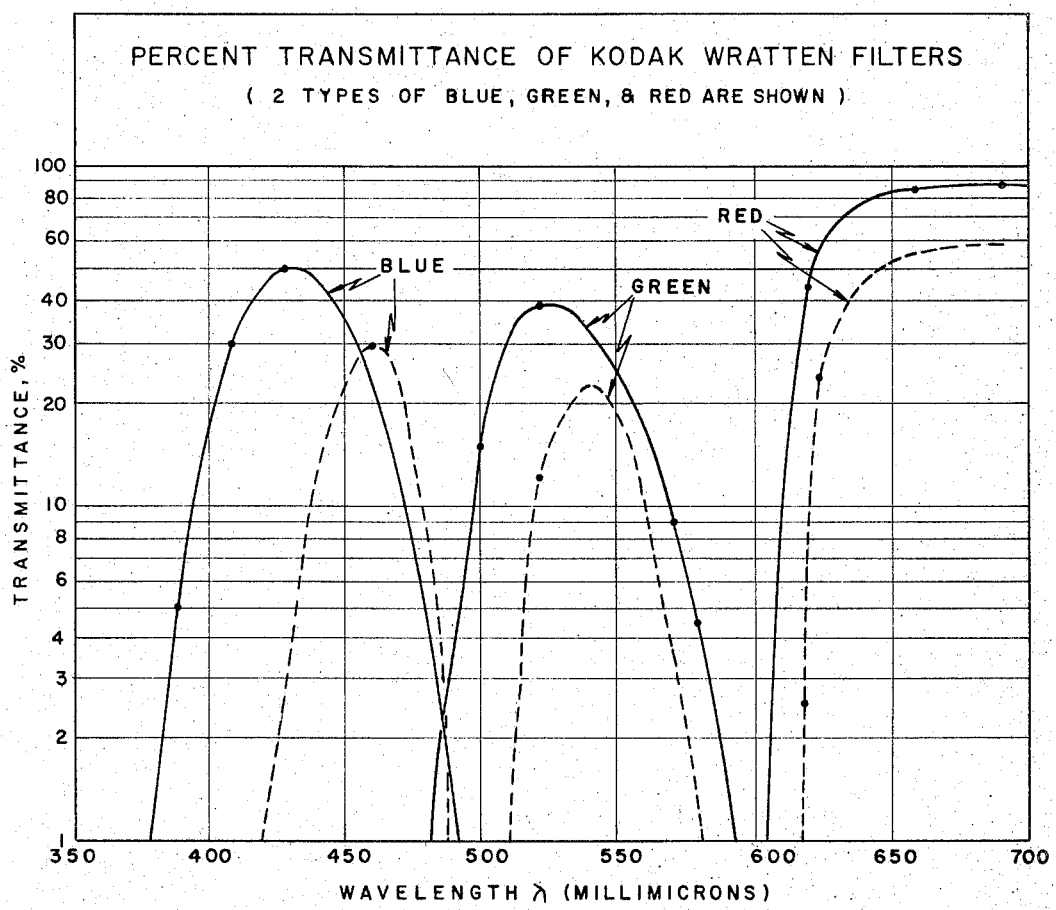
Figure 7:
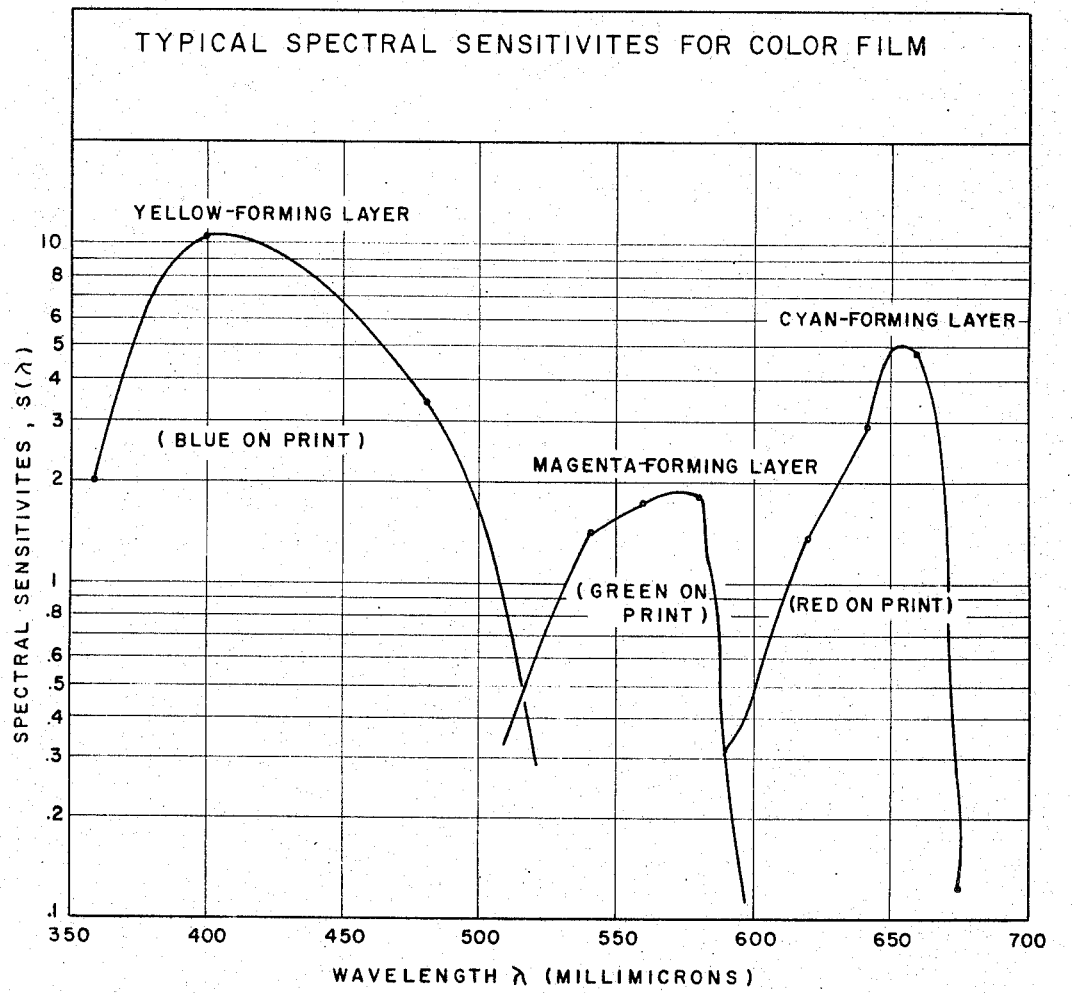

FIG. 5 is a plot of frequency response illustrating typical frequency bands for the outputs of the seismic filters or mixing circuits of FIGS. 1 or 3 on which is indicated the three colors reflected by the three galvanometers of FIGS. 2 or 4; and FIGS. 6 and 7 illustrate, respectively, wave length vs. transmittance for Kodak Wratten filters and typical spectral sensitivities for Kodak Ektacolor film, Type S.

Referring in FIG. 1, electrical signals 10, representative of the reflected seismic shock waves, are fed to a low phase distortion (LPD) type amplifier comprising delay line 11 and filter sections 12 having any desired number of delay line taps $t_0$ to $t_8$ to which are connected a desired number of narrow band pass filters 12a to 12i. The delay line 11 is commercially available and may be suitably of the type marketed and known as Epsco Delay Line. Its purpose, as is well known, is to compensate for the time delay of each narrow band filter and place the frequency of these signals in phase. The taps may be one millisecond time delay or greater; i.e., $t_1$ may be one millisecond; $t_2$ may be two milliseconds, etc. The number of filters may vary from three to any greater number depending upon the type display that is desired.

Each of these filters is adapted to pass a different portion of the seismic frequency spectrum, and in combination, the filters cover the entire spectrum from about 14 to about 77 cycles per second, although they are not necessarily limited to this frequency range. The filters may be sharply tuned filters, in which case the signal will flow through only one filter at any given instant, or they may be of the band type so that at certain frequencies where the band widths of adjacent filters overlap, the signal may pass through the two filters simultaneously. The exact band width of each filter will obviously depend upon the number of filters used and, therefore, in order to achieve sharp frequency discrimination over the entire seismic spectrum, a relatively large number of filters having relatively narrow band widths are preferably employed.

The output of each filter is set through resistors 13, a series of them being designated 13a to 13i, each of which is made variable or changeable so that the percentage of each signal sent to galvanometers 20a, b, and c may be varied as desired. Amplifiers 14a, b, and c are used between the resistor network 13 and the galvanometers in order to match the high impedance of the resistor network to the low impedance of the galvanometers so that the latter may be driven. The amplifiers are gain controlled so that their output does not exceed the dynamic range of the recording medium. They are of conventional design of a type commonly used in seismic work for driving galvanometers.

As arranged in FIG. 1, the output of filters 12a, b, and c is proportioned by the resistor network 13 to galvanometer 20a; filters 12d, e, and f send signals to galvanometer 20b; and filters 12g, h, and i send signals to galvanometer 20c. The three reflecting mirror galvanometers are of the type commonly used in seismic recording in which each galvanometer mirror is deflected angularly about an axis in proportion to the applied voltage. Referring to FIG. 2, each of the galvanometers reflects one of the three primary colors, green, red, or blue (or red, yellow, or blue) and for this purpose, a colored gelatin film 38 is placed in the light path between the light source and the mirrors of each of the galvanometers; e.g., blue (38a) for galvanometer 20a; red (38b) for galvanometer 20b; and green (38c) for galvanometer 20c. The center galvanometer 20b preferably reflects the red (or yellow) color. A light source 25, preferably a long filament tungsten lamp, projects light to the galvanometers through the double-tapered, variable density strip or light barrier 26 which is opaque in its center 27 and tapers to clear at its end 28 and 29. A rotatable film drum 30, driven by a motor 31, moves in a plane substantially perpendicular to the plane in which the galvanometers move and is arranged so that the galvanometers impinge their respective images on a common point on a photographic recording medium or film 32 arranged on film drum 30. A focusing lens 33 is used to focus the colored light reflected from the galvanometers to the common point on drum 30.

Initially, the color reproduction system is monitored by deflecting the three galvanometers to the clear portion (28 or 29) of the wedge 26 and then recording several traces on the film 32. The combination of colors blue, red, and green produces white light. A monitor on the developed film which can be read by any type of color meter is thus obtained. Variations of colors from sheet to sheet of film caused by differences in negative material, deterioration of light in the camera lamp 25, and differences in the film developing process can be corrected in the printing process by means of the monitor.

In the practice of the invention, each galvanometer is focused on the black center 27 of strip 26 at zero signal level as shown by the dotted lines and each reflects colored light of varying intensity to film drum 30 through the focusing lens 33 when the galvanometers swing to the right hand 28 or left hand 29 end portions of strip 26 in response to variations in amplitude of the signal.

The seismic signal passing through the filters normally varies considerably in frequency. Transients within the frequency range of filters 12a, 12b, and 12c which, as shown, are mixed, pass through those filters to galvanometer 20a and the galvanometer mirror is deflected to the right or to the left in proportion to the intensity of the signal. This produces a variable density image on film drum 30 in a color corresponding to the color of the blue light filter 38a in the light path to the mirror of galvanometer 20a. As the frequency of the signal changes from the range covered by filters 12a, b, and c into the range of the next bank of filters 12c, d, and e, the galvanometer 20b corresponding to these filters is energized and an image in a red color transmitted by film 38b is created on film drum 30 as light is reflected from this galvanometer mirror. In the same manner, galvanometer 20c is deflected to record green color of varying intensities on film 32 by light passing through film 38c. Galvanometers in the neutral position (or zero signal level) reflect no direct rays onto the film, and therefore, create no image. The colors are easily recognized and show distinctly frequency changes in the signal being recorded. A dark line appears on the film as each galvanometer into which current is passing moves through the neutral point, but this does not detract from the accuracy of the seismic record or impair its ease of interpretation.

Referring to FIG. 3, electrical signals 10 representative of the reflected seismic shock waves are first fed to the low phase distortion (LPD) type amplifier comprised of delay line 11 and the narrow band pass filters 12a to i described with reference to FIG. 1. However, the output of each filter in this instance is full wave rectified by rectifiers 5a to i. Each rectified signal is then passed through integrator circuits 6a to i. The time constant of each of the individual circuits may be adjusted to give a desired smoothing effect. The output of each of the integrator circuits is sent to a resistive network 7 which mixes in various percentage combinations the nine inputs to three outputs, 8a, b, and c. As illustrated in FIG. 3, output 8a may be a combination of 100% of the filter 6a, 75% of the filter 6b, 50% of the filter 6c, and 25% of the filter 6d. Output 8b may be the combination of 25%, 50%, 75%, 100%, 75%, 50%, and 25% of filters 6b, c, d, e, f, g, and h, respectively. Output 8c may be the combination of 25%, 50%, 75%, and 100% of filters 6f, g, h, and i, respectively. The mixing network 7 is not limited to the above-described percentages, as other combinations are possible. The three outputs, 8a, b, and c, are fed to three DC amplifiers 9a, b, and c, respectively, which are gain controlled so that their combined output does not exceed the dynamic range of the recording medium. The amplified signals from the DC amplifiers are fed to mirror galvanometers 20a, b, and c, shown in the optical recording system of FIG. 4.

As seen in FIG. 4, each of the galvanometers, 20a, b, c, functions to reproduce one of the primary additives (blue, red, green) colors as in the description of FIGS. 1 and 2. The light source 25 projects light to the galvanometers through a tapered variable density strip or light barrier 35 which is opaque at one end 36 and tapers to clear at its other end 37. The rotatable film drum 30, motor 31, film 32, and focusing lens 33 are the same as equivalent apparatus described relative to FIGS. 1 and 2. The apparatus of this modification is designed for producing half-cycle signals, or for use in producing signals whose total energy is one side of zero signal level (rectified signals). The galvanometers are positioned in the opaque portion of the barrier 35 while at rest (or zero signal level) and when driven, swing into the clearer area on the positive part of the cycle and into the total opaque area on the negative part of the cycle. Consequently, the negative going cycle is not reproduced and a half-wave presentation is achieved.

As illustrated in FIGS. 5 to 7, the transformation of the audio and sub-audio frequencies encountered in seismic data to the visual spectra of color wave lengths is linear. The seismic electrical filters separate the seismic data into three relatively narrow band widths as, for example, illustrated in FIG. 5, 20 to 24 c.p.s., designated A; 35 to 43 c.p.s., designated B; and 52 to 63 c.p.s., designated C, depending on the area from which the data is gathered. The output of each of these narrow band width filters or any combination of two or more of the filters is fed to a galvanometer in the manner described above. FIG. 5 shows typical response curves of the filters. The signals for curves A, B, and C are fed, respectively, to the galvanometers with color filters blue, green, and red as designated in FIG. 5.

In FIG. 6 two types of each color, blue, green, and red, are illustrated for the Kodak Wratten gelatin filter. The two types shown on the graph of FIG. 6 describe the transmittance vs. the wave length of light for each color filter. The response curves of the electrical seismic filters in FIG. 5 are similar to the shapes of the color filters of FIG. 6. It is readily seen that the translation or conversion of the frequencies of the seismic signals to visual wave lengths would be substantially linear.

In FIG. 7 are shown typical spectral sensitivities of the three layers of film used for the color recording. The layers are marked as shown, yellow, magenta, and cyan-forming. The colors reproduced on the final print are marked blue, green, and red on FIG. 7. Again, the similarity of the curves shown in FIGS. 5, 6, and 7 is to be noted.

Although not shown, the optical camera sections are enclosed in a light-proof case to prevent interference from outside light sources.

Recording drums 30 are driven by their motors at the same speed as the magnetic record on the playback drum when a record is being reproduced.

The recording method has been described as a single photographic trace recording; however, this method is readily adapted to multiple channel recording by providing suitable shielding for each separate channel.

The completed seismic photographic sections made in accordance with this invention may be viewed over a light table which is provided with the three primary color filters positioned over light bulbs adjustable to different intensities in order to produce a certain color or combination of colors outstanding to the eye of the observer. The section may also be viewed by placing it on a flat surface and focusing three lamps, each with different primary color filters and each adjustable to different intensities on it to produce a reflected color or combination of colors outstanding to the observer.

In this manner the light waves from one of the display colors or from a combination of the display colors are transmitted to the eye of the observer while all the other light waves are attenuated. Thus, in effect, a system is provided which permits filtering light waves similar to that in which electrical filters are used to pass or reject selected frequencies in a seismic band.

Calibration of the colors which appear on the recorded section is made with an oscillator signal placed on the section one trace at a time and covering the entire seismic spectrum of the electrical filters being used. For example, the first trace might be 10 c.p.s.; the next, 12 c.p.s.; the next, 14 c.p.s.; and so on in increments of 2 c.p.s. until the highest frequency to be used; e.g., 100 c.p.s. is reached. This calibration chart will be illuminated along with the seismic information recorded when being viewed with the three-color viewing apparatus. Thus, if the light filters are set so that a seismic event of a particular color is accentuated, then the seismic frequency of the event can be read from the illuminated traces of the calibrated chart.

Having fully described the nature, objects, apparatus and method of the invention, we claim:

1. A system for photographically recording in color seismic wave energy reflected from reflecting subsurfaces comprising in combination:
   a plurality of electrical filters adapted to pass transients within selected frequency bands, electrically connected to said source of seismic energy;
   three reflecting mirror galvanometers;
   a light source;
   a light barrier tapering from opaque to clear positioned between said mirror galvanometers and said light source;
   a color-sensitive photographic medium arranged to receive reflected light from said galvanometers;
   light filters adapted to impart a different primary color to the light rays reflected by each of said galvanometer mirrors; and
   said galvanometers being arranged to reflect no light at the zero amplitude level and full light at the highest amplitude level whereby the selected frequency range is represented by a color of varying intensity representative of its amplitude.

2. A system as recited in claim 1 which includes an electrical network comprising:
   full-wave rectifiers connected to said electrical filters;
   integrator circuits connected to said full-wave rectifiers;
   a mixing circuit connected to said integrator circuits; and
   DC amplifiers connected to said mixing circuit outputs.

3. A system as recited in claim 1 wherein said light barrier is opaque at the center and tapers to clear at each end; and including means for providing a full-wave signal.

4. A system as recited in claim 1 wherein said light barrier is opaque at one end and tapers to clear at the other end; and including means to provide a half-wave rectified signal.

5. A system as recited in claim 1 wherein said galvanometers are arranged such that red color represents a middle frequency band and blue and green represent frequency bands above and below said middle frequency band respectively.

6. A system as recited in claim 1 wherein said galvanometers are arranged such that yellow color represents a middle frequency band and red and blue represent frequency bands above and below said middle frequency band respectively.

7. Apparatus for recording seismic wave energy as photographic traces comprising:
   three light reflecting means, each movable in response to variations in amplitude of said seismic wave energy and each causing reproduction of a different selected primary color;
   a light source;
   a light barrier tapering from opaque to clear positioned between said light source and said light reflecting means;

a color-sensitive means adapted to receive light reproduced by said reflecting means; and means adapted to pass transients within three selected frequency bands representative of said seismic wave energy to said reflecting means, each of said frequency bands being passed to a different reflecting means and each of said three light reflecting means being arranged so as to reflect no light at zero amplitude level and full light at highest amplitude level to the same point on said color-sensitive means such that said primary colors reproduced by said reflecting means and combinations of said selected colors are received by said color-sensitive means thereby to convert linearly seismic frequency spectra to recorded light wave lengths.

8. Apparatus as recited in claim 7 in which said three selected colors are red, yellow and blue.

9. Apparatus as recited in claim 7 in which said three selected colors are blue, red and green.

10. Apparatus as recited in claim 7 including means adapted to place frequencies representative of said seismic wave energy in phase.

11. Apparatus as recited in claim 10 in which said three selected colors are red, yellow and blue.

12. Apparatus as recited in claim 10 in which said three selected colors are blue, red and green.

13. Apparatus as recited in claim 10 including means adapted to electrically filter and mix signals representative of said seismic wave energy to produce said three selected frequency bands.

14. Apparatus as recited in claim 10 including means adapted to full-wave rectify and integrate said seismic signals representative of said seismic wave energy.

15. Apparatus as recited in claim 10 including means adapted to half-wave rectify said seismic signals representative of said seismic wave energy.

16. Apparatus as recited in claim 10 which includes an electrical network comprising:

full-wave rectifiers connected to said means adapted to pass transients within selected frequency bands;

integrator circuits connected to said full-wave rectifiers;

a mixing circuit connected to said integrator circuits; and

D.C. amplifiers connected to said mixing circuit outputs.

17. Apparatus as recited in claim 10 wherein said light barrier is opaque at the center and tapers to clear at each end; and including means for providing a full-wave rectified signal.

18. Apparatus as recited in claim 10 wherein said light barrier is opaque at one end and tapers to clear at the other end; and including means to provide a half-wave rectified signal.

19. Apparatus as recited in claim 10 wherein said light reflecting means are arranged such that red color represents a middle frequency band; and blue and green represent frequency bands above and below said middle frequency band, respectively.

20. Apparatus as recited in claim 10 wherein said light reflecting means are arranged such that yellow color represents a middle frequency band; and red and blue represent frequency bands above and below said middle frequency band, respectively.

References Cited

UNITED STATES PATENTS 2,991,446    7/1961    Loper _____ 346—46

RICHARD B. WILKINSON, *Primary Examiner.*

M. LORCH, *Assistant Examiner.*